(12) United States Patent
Elliott et al.

(10) Patent No.: US 6,351,342 B1
(45) Date of Patent: *Feb. 26, 2002

(54) DISC DRIVE SERVO SYSTEM WITH DUAL HEAD SAMPLING

(75) Inventors: Mark L. Elliott, Eden Prairie; Paul A. Galloway, Prior Lake, both of MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/712,638

(22) Filed: Aug. 28, 1996

Related U.S. Application Data

(60) Provisional application No. 60/018,302, filed on May 24, 1996.

(51) Int. Cl.[7] .............................................. G11B 5/596
(52) U.S. Cl. ...................................... 360/77.08; 360/75
(58) Field of Search .......................... 360/77.05, 77.07, 360/77.08, 78.04, 78.14, 75, 77.01, 78.01; 369/44.34

(56) References Cited

U.S. PATENT DOCUMENTS

| | | | |
|---|---|---|---|
| 4,807,063 A | | 2/1989 | Moteki ..................... 360/77.07 |
| 4,809,120 A | | 2/1989 | Ozawa ..................... 360/78.14 |
| 4,833,551 A | * | 5/1989 | Song .................... 360/77.08 X |
| 4,896,228 A | | 1/1990 | Amakasu et al. ......... 360/77.08 |
| 4,924,160 A | | 5/1990 | Tung ....................... 560/77.06 |
| 5,132,854 A | * | 7/1992 | Tsuyoshi et al. .......... 360/78.14 |
| 5,307,218 A | * | 4/1994 | Kitamura et al. ......... 360/77.08 |
| 5,321,564 A | * | 6/1994 | Takahashi et al. ........ 360/77.04 |
| 5,477,402 A | * | 12/1995 | Elliot et al. ............... 360/77.08 |

FOREIGN PATENT DOCUMENTS

JP        1-106375     *  4/1989    .............. 360/77.07

* cited by examiner

*Primary Examiner*—David Hudspeth
*Assistant Examiner*—K. Wong
(74) *Attorney, Agent, or Firm*—Joseph R. Kelly; Westman, Champlin & Kelly, P.A.

(57) ABSTRACT

A servo system positions a transducer over a disc surface in a disc drive system. Disc surfaces in the drive each have a plurality of spaced servo samples recorded thereon. The servo samples on at least two of the disc surfaces are recorded in skewed relation to one another. A plurality of transducers are provided and one transducer is associated with each one of the plurality of disc surfaces. An actuator arm assembly is coupled to the transducers to move the transducers relative to the disc surfaces. A servo control system is coupled to the actuator arm assembly to control position of the actuator arm assembly. The servo control system includes a reader configured to read servo samples from at least two disc surfaces such that at least two servo samples are read within one servo time period.

12 Claims, 3 Drawing Sheets

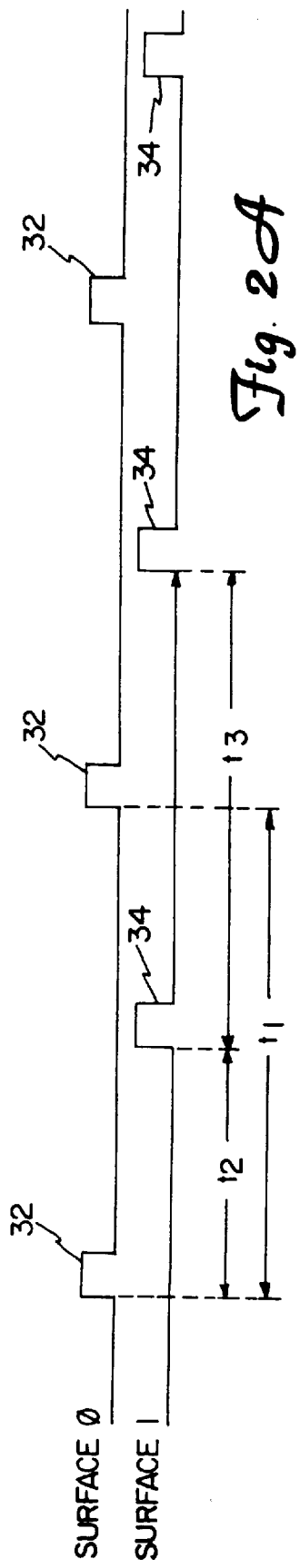
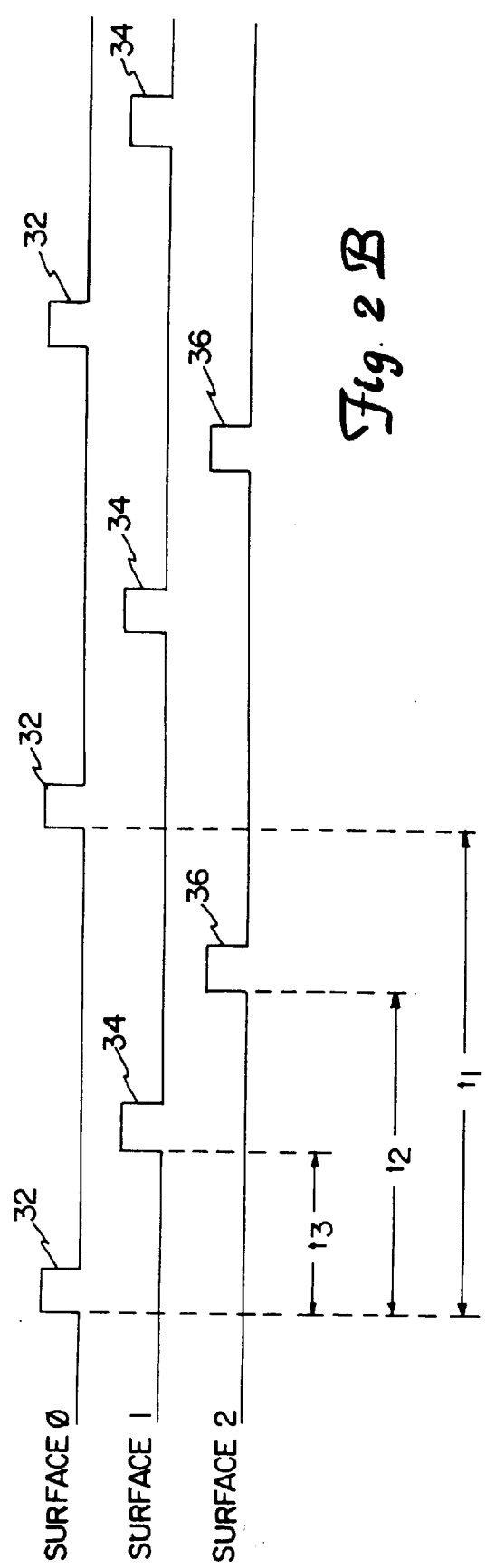

DISC DRIVE SERVO SYSTEM WITH DUAL HEAD SAMPLING

REFERENCE TO RELATED APPLICATION

The present application is based on a provisional application Ser. No. 60/018,302 filed on May 24, 1996.

BACKGROUND OF THE INVENTION

The present invention relates to disc drives. More particularly, the present invention relates to a servo positioning system in a disc drive.

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is typically conditioned and then decoded by the drive controller to recover data represented by flux reversals stored on the magnetic disc, and consequently represented in the read signal provided by the data head.

In an embedded servo-type system, servo information is recorded on tracks which also contain data stored on the disc drive. The servo data (or servo bursts) are written on the data tracks and are commonly evenly temporally spaced about the circumference of each track. Data to be stored on the disc drive is written between the servo bursts.

As a transducer reads the servo information, the transducer provides a position signal which is decoded by a position demodulator and presented in digital form to a servo control processor. The servo control processor essentially compares actual radial position of the transducer over the disc (as indicated by the embedded servo burst) with desired position and commands the actuator to move in order to minimize position error.

In the past, dedicated servo-type systems were used. In a dedicated servo system, an entire disc surface in a disc drive was dedicated to servo information. Thus, high sample rates from the servo information could be maintained. However, in order to increase disc storage capacity, the above-described embedded (or sectored) servo systems are used. One disadvantage of this type of system is that, since data is also stored on the tracks containing servo information, the sample rate obtainable for servo information is lower than with a dedicated servo system. As the sample rate of the servo position information decreases, certain performance limitations increase.

SUMMARY OF THE INVENTION

A servo system positions a transducer over a disc surface in a disc drive system. Disc surfaces in the drive each have a plurality of spaced servo samples recorded thereon. The servo samples on at least two of the disc surfaces are recorded in skewed relation to one another. A plurality of transducers are provided and one transducer is associated with each one of the plurality of disc surfaces. An actuator arm assembly is coupled to the transducers to move the transducers relative to the disc surfaces. A servo control system is coupled to the actuator arm assembly to control position of the actuator arm assembly. The servo control system includes a reader configured to read servo samples from at least two disc surfaces such that at least two servo samples are read within one servo time period.

BRIEF DESCRIPTION OF THE DRAWINGS

FIGS. 2A and 2B are timing diagrams illustrating operation of the present invention.

DETAILED DESCRIPTION OF THE PREFERRED EMBODIMENTS

Figure 1:
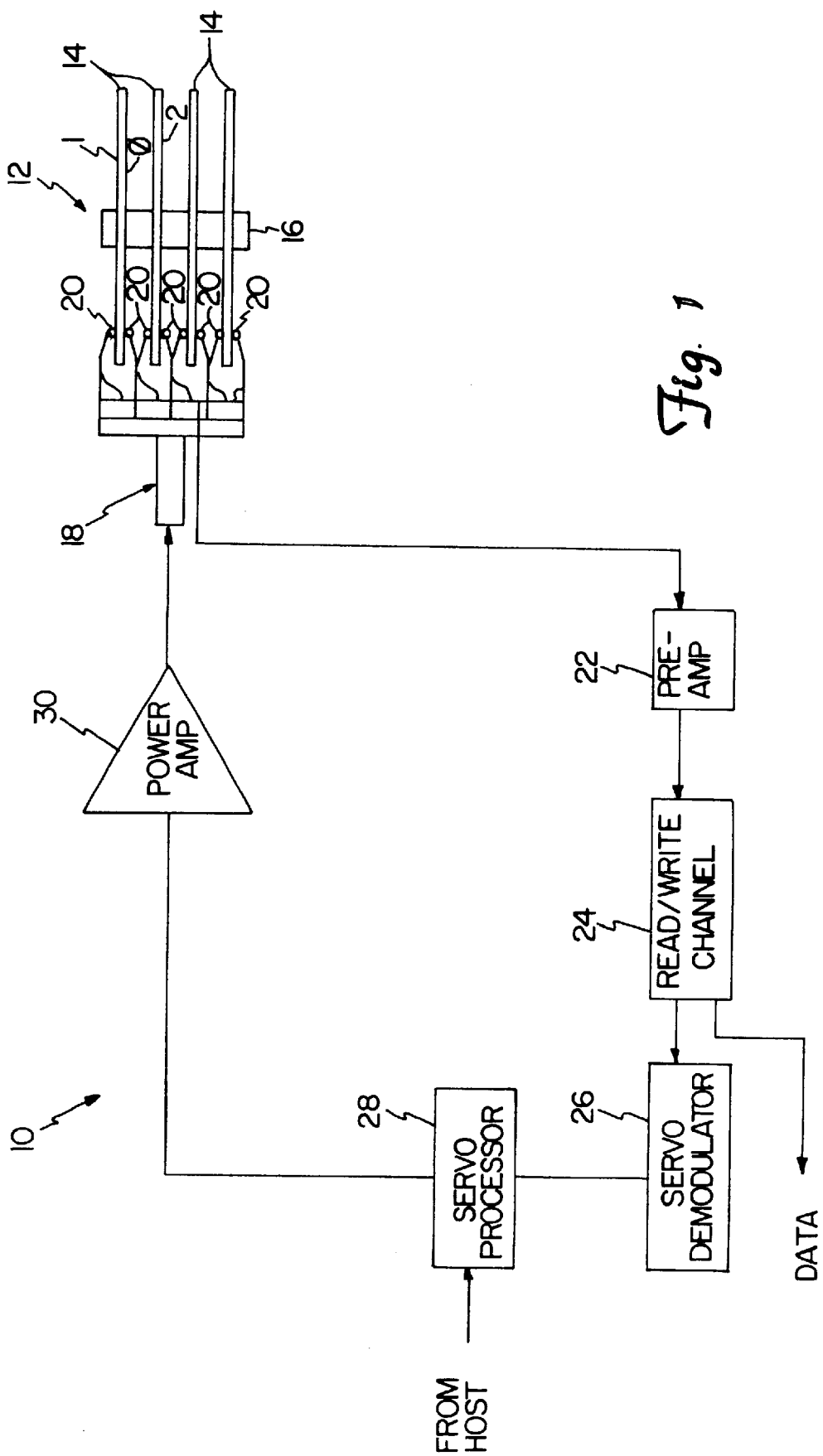
FIG. 1 is a block diagram of a portion of a disc drive according to the present invention.

FIG. 1 is a block diagram of a portion of a positioning system 10 in a disc drive according to the present invention. Positioning system 10 includes disc stack 12, electromechanical actuator 18, preamplifier 22, read/write channel 24, servo demodulator 26, servo processor 28, and power amplifier 30.

The stack 12 of magnetically encodable discs 14 is mounted for rotation about a spindle 16. Electromechanical actuator 18 is used to position a number of data transducers 20 radially with respect to discs 14. Preferably, one transducer 20 is associated with each surface of each disc 14. Transducers 20 read data, including servo bursts, from the surfaces of their associated magnetic discs 14. The transducers 20 read the data by providing a read signal which represents the flux reversals encoded on the associated surfaces of magnetic discs 14.

When it is desired to read from one of the transducers 20, the specific transducer 20 is selected using appropriate multiplexing circuitry (not shown) and its read signal is provided to a preamplifier 22. Preamplifier 22 amplifies the read signal from the selected transducer 20 and provides an amplified signal to read/write channel 24. Read/write channel 24 recovers information from the read signal provided by preamplifier 22. The information recovered by read/write channel 24 includes data stored on disc stack 12, as well as servo information written on the disc surfaces of disc stack 12. The data is provided to a disc drive controller or host system (not shown).

The servo information which is recovered from read/write channel 24 is provided to servo demodulator 26. Servo demodulator 26 decodes the servo burst to extract position information and presents that information, in digital form, to servo control processor 28. The position information represents the actual position of the selected transducer 20 over its associated disc surface. Servo control processor 28 compares the decoded position signal received from servo position demodulator 26 with a desired position signal to determine a transducer position error. The transducer position error represents the difference between the actual position of the selected transducer 20, indicated by the decoded position signal, and the desired position indicated by the desired position signal.

Servo control processor 28 then generates a position correction signal which is converted to an analog signal by a digital-to-analog (D/A) converter (not shown) and applied to actuator 18 through power amplifier 30. The position correction signal causes actuator 18 to move transducers 20 radially with respect to the surfaces of discs 14 in order to minimize the transducer position error.

FIG. 2A is a timing diagram which illustrates a preferred encoding of servo bursts on the surfaces of discs 14. In the description relative to FIG. 2A, discs 14 are assumed to have two opposite surfaces on which data is recorded. Those surfaces are referred to as surface 0 and surface 1. In the preferred embodiment, the servo bursts on surface 0 are recorded in skewed relation to the servo bursts on surface 1.

For example, FIG. 2A illustrates that servo bursts 32 are recorded each servo time period, $t_1$ on disc surface 0. Data to be stored on surface 0 is written between servo bursts 32. In addition, in the preferred embodiment, servo information stored on surface 1 (the surface opposite surface 0 on the same disc 14) is recorded once each servo time period $t_3$, where $t_1$ is equal to $t_3$. However, the servo bursts 34 stored on surface 1 are skewed in time relative to servo bursts 32 on surface 0 such that servo bursts 34 occur a time $t_2$ after servo burst 32. In the preferred embodiment, time $t_2$ is equal to one-half of time periods $t_1$ and $t_3$ such that servo bursts 34 occur half-way between servo bursts 32.

During a track seek operation (and referring again to FIG. 1) servo control processor 28 is provided with a destination track signal from a host or other controller. The destination track signal represents a track over which servo processor 28 is to position a desired transducer 20. Servo control processor 28 then provides a position signal through power amplifier 30 to actuator 18. Actuator 18, in turn, seeks to the desired track (i.e., moves transducers 20 radially relative to associated surfaces of disc 14 so that transducers 20 are positioned over the desired track).

During such a track seek operation, the disc drive is not reading back data from disc stack 12, but is only reading position information so that servo control processor 28 can determine when actuator 18 has moved transducers 20 to the correct track. In prior systems, servo processor 28 would simply choose a desired transducer 20 and read the servo bursts (such as servo burst 32 from surface 0) once every servo time period $t_1$.

However, in one preferred embodiment of the present invention, servo control processor 28 alternately reads servo bursts 32 and 34 from surfaces 0 and 1 during the track seek operation. In other words, servo control processor 28 first selects a transducer 20 corresponding to surface 0 and reads a first servo burst 32. Then, after reading the first servo burst 32, servo control processor 28 selects a second transducer 20 corresponding to surface 1 and reads a servo burst 34 from surface 1. Servo control processor 28 continues this alternate reading of servo bursts from surfaces 0 and 1 until the track seek operation is complete. This allows servo control processor 28 to receive a servo burst from the selected disc 14 every time period $t_2$ which is approximately one-half of the normal servo time period $t_1$. This effectively doubles the sample rate for servo system 10 thereby significantly enhancing drive performance without adding any additional hardware to the disc drive. Also, since no data is being read during a track seek operation, the present invention can be accomplished without any deterioration in data access times or throughput.

FIG. 2B is a timing diagram of another preferred embodiment of the present invention. In FIG. 2B, servo bursts are recorded on three surfaces in disc stack 12 (surface 0, surface 1 and surface 2). In this embodiment, the servo bursts 32 and 34 (on surfaces 0 and 1, respectively) are not offset from one another by one-half of servo time period $t_1$. Rather, servo bursts 32 and 34 are offset from one another by a time period $t_3$ which is approximately one-third of servo time period $t_1$. In addition, servo bursts 36, which are recorded on surface 2 in disc stack 12, are separated from servo bursts 34 by another time period $t_3$ which is one-third of servo time period $t_1$. Therefore, from the initiation of the first servo burst 32, servo burst 34 is offset by a time period $t_3$ which is one-third of servo time period $t_1$ and servo burst 36 is offset by a time period $t_2$ which is two-thirds of servo time period $t_1$.

With this recording scheme, feedback system 10 switches between three transducers 20 associated with surfaces 0, 1 and 2 during a track seek operation. This allows servo control processor 28 to obtain three servo bursts during a single servo time period $t_1$, rather than only the single servo burst which was obtained in prior drives. This effectively triples the sample rate for servo control processor 28 without adding additional hardware to feedback system 10.

Of course, the technique of skewing servo bursts on the plurality of surfaces can be carried out for any suitable number of surfaces. However, in the preferred embodiment, the servo samples should be equally spaced from one another among the several disc surfaces which are used. Also, it has been found that a preferred embodiment of the present invention is to use the opposite surfaces of a single disc 14. Discs 14 have been found to have certain eccentricities. However, those eccentricities typically affect both the top and bottom surfaces of the disc 14 approximately equally. Thus, the eccentricities have little affect on accuracy. However, working across multiple discs 14 makes the correlation of the servo samples among the surfaces in disc stack 12 a bit more cumbersome and possibly less accurate.

Figure 3:
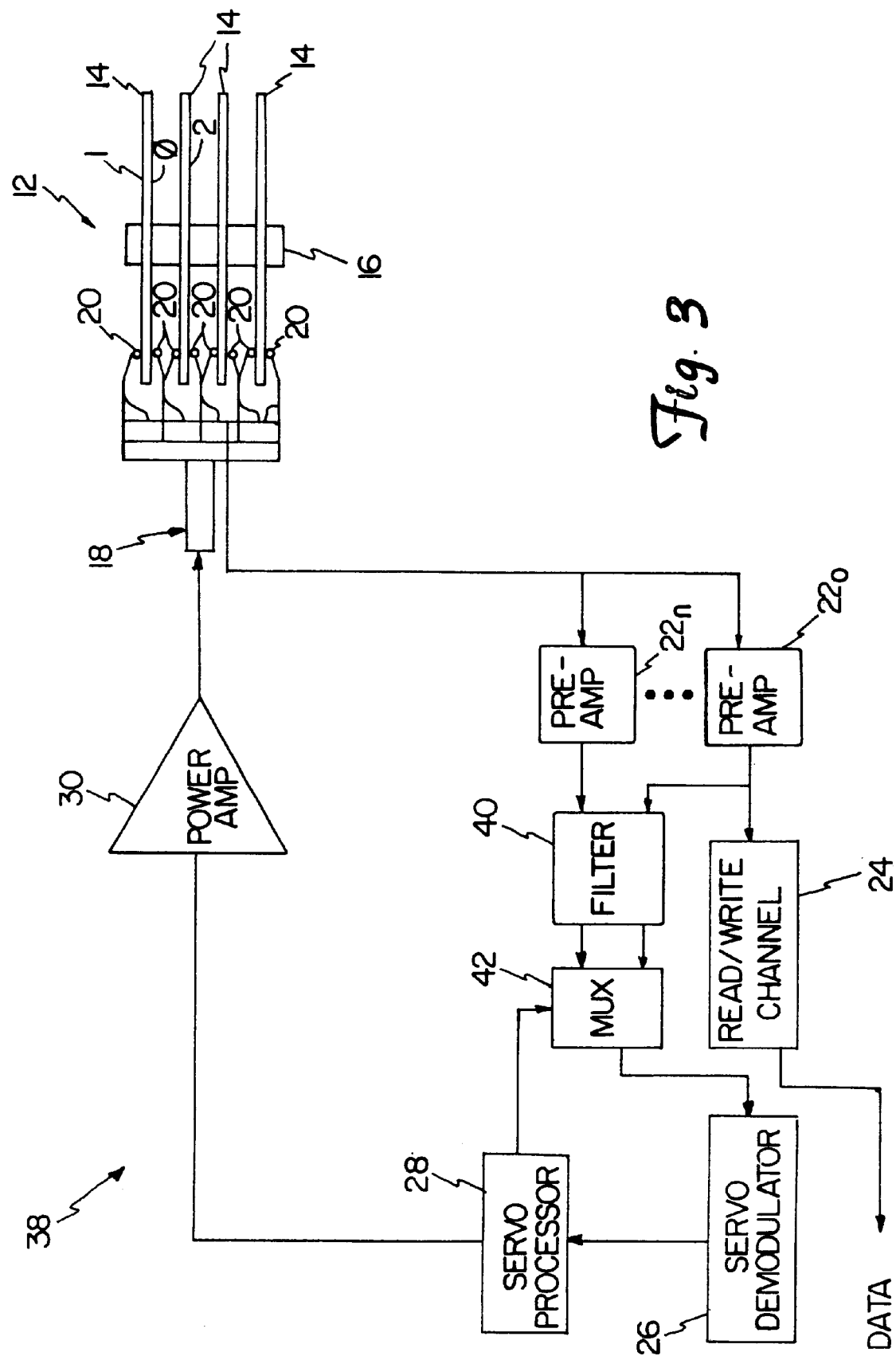
FIG. 3 is a block diagram illustrating another embodiment of a portion of a disc drive according to the present invention.

FIG. 3 is another embodiment according to the present invention in which the sample rate of the servo bursts is increased even during a track following operation. In a track following operation, actuator 18 holds a selected transducer 20 in a single radial position over a desired track so that data can be recovered from that track. The embodiment shown in FIG. 3 provides a small quantity of additional hardware on the drive so that multiple servo bursts can be read even during a track following operation.

The positioning circuit 38 shown in FIG. 3 is similar to positioning circuit 10 shown in FIG. 1, and similar items are similarly numbered. However, positioning system 38 differs from positioning system 10 in that a plurality of preamplifiers $22_0$ through $22_n$ are provided in the circuit, along with additional filtering circuit 40 and a multiplexer 42. In addition, the output of read/write channel 24 is no longer provided to servo position demodulator 26, but instead simply goes to the data output.

With feedback system 38, and during a track following operation, the selected transducer 20 provides its read signal to preamplifier $22_0$ which, in turn, provides an amplified signal to read/write channel 24. As with the system shown in FIG. 1, read/write channel 24 recovers data from the amplified read signal and provides that data to the host or other similar controller.

However, the output of preamplifier $22_0$ is also provided to filter circuit 40. In addition, a suitable number of other transducers 20 also provide read signals to the remainder of preamplifiers 22. The output of those preamplifiers provide amplified read signals to filtering circuit 40 which, in turn, provides a filtered output signal to multiplexer 42.

Servo control processor 28 provides a select signal to multiplexer 42 to choose one of the transducers 20 from which to read a servo burst. That servo burst is provided from multiplexer 42 to servo demodulator 26 which demodulates the servo position information and provides it, in digital form, to servo control processor 28. Servo control processor 28 controls multiplexer 42 to switch through the various transducers 20 in order to read multiple servo bursts during each servo time period $t_1$.

Of course, servo control processor 28 can control multiplexer 42 to read from any suitable number of transducers 20 during a track following operation such that the servo sampling rate is increased to a desired level. It should also be noted that feedback system 38 shown in FIG. 3 is suitable for obtaining the increased sampling rate during a track seek operation as described with respect to FIG. 1. However, with the simple addition of a small amount of preamplifying circuitry $22_0$ through $22_n$ as well as filtering circuitry 40 and multiplexing circuitry 42, feedback system 38 provides the ability to increase the servo sampling rate even while data is being read during a track following operation.

Therefore, it can be seen that the present invention increases servo sampling rates by alternately switching between two transducers on opposite sides of a disc to double the sample rate. The present invention can also optionally switch between three or more transducers 20 to read from the surfaces of multiple discs to drastically increase the servo sampling rate.

It should also be noted that, while the present invention has been discussed with respect to reading a servo burst from a single transducer and then switching among a plurality of transducers, the transducers can also be read in parallel with the duplication of additional circuitry (such as servo demodulator circuitry 26) in the positioning system.

It should be further noted that, while the present invention has been discussed with respect to an embedded servo-type system, it could also be used in a hybrid servo system. Hybrid systems typically include both embedded servo information and a dedicated servo surface. The present invention would be used in reading information from the embedded servo portion of the drive.

Although the present invention has been described with reference to preferred embodiments, workers skilled in the art will recognize that changes may be made in form and detail without departing from the spirit and scope of the invention.

What is claimed is:

1. A method of controlling position of an actuator arm in a disc drive, comprising:
   providing a disc having first and second disc surfaces, each of the first and second disc surfaces having servo samples recorded thereon, the servo samples recorded on the first and second disc surfaces being in skewed relation to one another and separated by a servo spacing;
   moving the first and second disc surfaces relative to first and second transducers, each of the first and second transducers being positioned relative to one of the first and second disc surfaces to read information therefrom, the servo samples on each disc surface moving past the corresponding transducer at a rate of one servo sample each servo time period;
   writing data to the first disc surface, the data including servo samples;
   during writing data to the first disc surface, reading servo samples intermittently from the second disc surface; and
   controlling the position of the actuator arm based on the servo samples read.

2. The method of claim 1 wherein reading servo samples comprises:
   reading servo samples from the first disc surface; and
   between reads of the servo samples from the first disc surface, reading servo samples from the second disc surface.

3. The method of claim 2 wherein reading servo samples from the first disc surface comprises:
   reading consecutive servo samples from the first disc surface, one servo sample being read each servo time period.

4. The method of claim 3 wherein reading servo samples from the second disc surface comprises:
   reading consecutive servo samples from the second disc surface, one servo sample being read each servo time period.

5. The method of claim 4 wherein reading consecutive servo samples from the first and second disc surfaces comprises:
   reading from a first transducer associated with the first disc surface and a second transducer associated with the second disc surface such that at least two servo samples are read each servo time period.

6. The method of claim 1 and further comprising:
   performing a track following operation to follow a designated track; and
   wherein reading servo samples is performed during the track following operation.

7. A disc drive, comprising:
   a disc having first and second disc surfaces, each of the first and second disc surfaces having a plurality of spaced servo samples recorded thereon, the servo samples on the first and second disc surfaces being recorded in skewed relation to one another;
   first and second transducers associated with the first and second disc surfaces, respectively, each of the transducers adapted to read data from, write data to, and read servo samples from its associated disc surface;
   a motor operably coupled to the disc surfaces to move the disc surfaces relative to the transducers such that the servo samples pass the associated transducers once each servo time period;
   an actuator arm assembly coupled to the transducers to move the transducers relative to the disc surfaces; and
   a servo control apparatus coupled to the actuator arm assembly to control position of the actuator arm assembly, the servo control apparatus configured to cause the second transducer to intermittently read servo samples from the second disc surface while the first transducer is writing data to the first disc surface, the data including servo samples.

8. The disc drive of claim 7 wherein the servo control apparatus includes a selector for intermittently using the second transducer associated with the second disc surface to read the servo samples from the second disc surface such that at least two servo samples are read each servo time period.

9. A method of controlling position of an actuator arm in a disc drive, comprising:
   providing a plurality of discs, a first of the plurality of discs having first and second disc surfaces, each of the first and second disc surfaces having servo samples recorded thereon, the servo samples recorded on the first and second disc surfaces being in skewed relation to one another and separated by a servo spacing;

moving the first and second disc surfaces relative to first and second transducers, each of the first and second transducers being positioned relative to one of the first and second disc surfaces to read information therefrom, the servo samples on each disc surface moving past the corresponding transducer at a rate of one servo sample each servo time period;

performing a seek operation by moving radially over the first surface to seek to a desired track;

during the seek operation, reading servo samples alternately from the first and second disc surfaces such that more than one servo sample is read within one servo time period; and controlling the position of the actuator arm based on the servo samples read.

10. The method of claim 9 wherein reading servo samples comprises:

reading servo samples from the first disc surface; and between reads of the servo samples from the first disc surface, reading servo samples from the second disc surface.

11. The method of claim 10 wherein reading servo samples from the first disc surface comprises:

reading consecutive servo samples from the first disc surface, one servo sample being read each servo time period.

12. The method of claim 11 wherein reading servo samples from the second disc surface comprises:

reading consecutive servo samples from the second disc surface, one servo sample being read each servo time period.

* * * * *